United States Patent
Jagmag

(10) Patent No.: US 9,805,508 B1
(45) Date of Patent: Oct. 31, 2017

(54) ACTIVE AUGMENTED REALITY DISPLAY ENHANCEMENT

(71) Applicant: MARVELL INTERNATIONAL LTD., Hamilton (BM)

(72) Inventor: Adil Jagmag, Hollis, NH (US)

(73) Assignee: MARVELL INTERNATIONAL LTD, Hamilton (BM)

( * ) Notice: Subject to any disclaimer, the term of this patent is extended or adjusted under 35 U.S.C. 154(b) by 139 days.

(21) Appl. No.: 14/227,400

(22) Filed: Mar. 27, 2014

Related U.S. Application Data

(60) Provisional application No. 61/807,125, filed on Apr. 1, 2013.

(51) Int. Cl.
G09G 5/00 (2006.01)
G06T 19/00 (2011.01)

(52) U.S. Cl.
CPC .................. G06T 19/006 (2013.01)

(58) Field of Classification Search
CPC .................................................. G06T 19/006
USPC ......................................................... 345/633
See application file for complete search history.

(56) References Cited

U.S. PATENT DOCUMENTS

| | | | |
|---|---|---|---|
| 2003/0055498 A1* | 3/2003 | Paul ...................... | A61F 2/1613 623/6.17 |
| 2003/0169213 A1* | 9/2003 | Spero ....................... | G02B 5/20 345/7 |
| 2008/0024623 A1* | 1/2008 | Seo .......................... | H04N 5/235 348/229.1 |
| 2008/0285797 A1* | 11/2008 | Hammadou ....... | G06K 9/00771 382/103 |
| 2009/0102935 A1* | 4/2009 | Hung ...................... | H04N 5/235 348/222.1 |
| 2012/0154441 A1* | 6/2012 | Kim .................... | G06K 9/00832 345/633 |
| 2013/0108106 A1* | 5/2013 | Dougal ................ | G06K 9/6202 382/103 |
| 2014/0063055 A1* | 3/2014 | Osterhout ............... | G06F 3/005 345/633 |

* cited by examiner

Primary Examiner — Zhengxi Liu
Assistant Examiner — Yi Yang

(57) ABSTRACT

Systems, methods, and other embodiments associated with enhancing an augmented reality display are described. According to one embodiment, a method for enhancing an augmented reality display includes identifying, within an image of a viewing region, a target object visible to a user through a display; and displaying an enhancement graphic on the display such that the enhancement graphic is superimposed over the target object from the user's point of view.

29 Claims, 4 Drawing Sheets

ACTIVE AUGMENTED REALITY DISPLAY ENHANCEMENT

CROSS REFERENCE TO RELATED APPLICATIONS

This patent disclosure claims the benefit of U.S. Provisional Application Ser. No. 61/807,125 filed on Apr. 1, 2013, which is hereby wholly incorporated by reference.

BACKGROUND

Augmented reality displays are quickly gaining popularity as a way to enhance a user's view of their surroundings. Augmented reality displays project graphics on a transparent or semi-transparent display through which a user views the surrounding region. Wearable augmented reality displays are also being developed. These wearable displays display, on an eyepiece lens, a wide variety of graphics that communicate message notifications, music preferences, news alerts, and many other types of information to a wearer. Augmented reality windshields are being developed that will display navigation and travel related information on the windshield. The graphics are typically displayed around the periphery of a user's field of vision such that objects in the user's main field of vision are not obstructed by the graphics.

SUMMARY

In general, in one aspect this specification discloses an apparatus. The apparatus includes identification logic and enhancement logic. The identification logic is configured to identify, within an image of a viewing region, a target object visible to a user through a display. The enhancement logic is configured to cause an enhancement graphic to be displayed on the display such that the enhancement graphic is superimposed over the target object from the user's point of view.

In one embodiment, the enhancement logic is configured to access a transformation that maps a first position of a target object in the image to a second position on the display. The second position corresponds to a position on the display through which the user looks to view the target object in the viewing region. The enhancement logic is configured to display the enhancement graphic at the second position on the display.

In one embodiment, the identification logic is configured to identify the target object by analyzing information for a detection region of the image, such that information for portions of the image outside the detection region are not analyzed.

In one embodiment, the display includes a windshield; the target object is a headlight of an oncoming vehicle; and the enhancement graphic includes a semi-opaque graphic configured to reduce glare.

In one embodiment, the display is worn by the user; the target object is a light source; and the enhancement graphic includes a semi-opaque graphic configured to reduce glare.

In general, in another aspect, this specification discloses a method for enhancing an augmented reality display. The method includes identifying, within an image of a viewing region, a target object visible to a user through a display; and displaying an enhancement graphic on the display such that the enhancement graphic is superimposed over the target object from the user's point of view.

In one embodiment, the method also includes accessing a transformation that maps a first position of a target object in the image to a second position on the display, wherein the second position corresponds to a position on the display through which the user looks to view the target object in the viewing region; and displaying the enhancement graphic at the second position on the display.

In one embodiment, the identifying includes analyzing information for a detection region of the image, such that information for portions of the image outside the detection region are not analyzed.

In general, in another aspect, this specification discloses a device that includes a first integrated circuit and a second integrated circuit. The first integrated circuit is configured to identify, within an image of a viewing region, a target object visible to a user through a display. The second integrated circuit is configured to cause an enhancement graphic to be displayed on the display such that the enhancement graphic is superimposed over the target object from the user's point of view.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

To date, the focus of augmented reality systems has been to display information in the peripheral view of a user. However, in some instances it may be desirable to alter the appearance of selected objects in view of the user to enhance the user's experience. For example, in an augmented reality windshield, the headlights of an oncoming vehicle could be shielded with a semi-transparent or otherwise glare-reducing graphic to improve a driver's ability to see. In augmented reality glasses, the sun or other bright light sources could be similarly shielded to reduce glare. Of course, shielding bright objects with a semi-transparent graphic to reduce glare is only one way in which objects may be enhanced in an augmented reality system.

Figure 1:
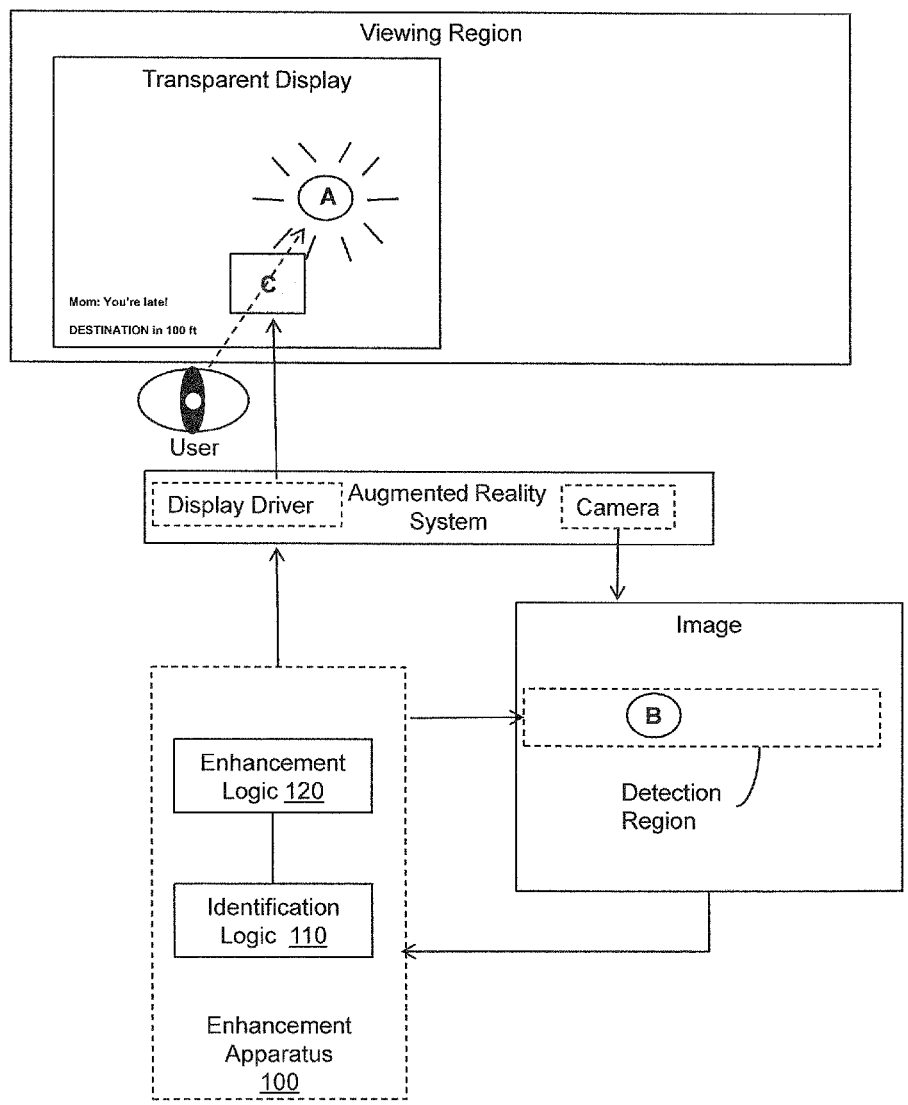
FIG. 1 illustrates one embodiment of an apparatus associated with active augmented reality display enhancement that provides object identification and shielding.

Apparatus and methods described herein interact with an augmented reality system to identify a target object in an image of a user's field of vision and display an enhancement graphic superimposed on the target object on the augmented reality system's display. With reference to FIG. 1, one embodiment of an enhancement apparatus 100 is shown that is associated with active augmented reality display enhancement. In one embodiment, the enhancement apparatus 100 is implemented on a chip or integrated circuit device (see FIG. 4) including one or more integrated circuits configured to perform one or more of the functions described herein. The enhancement apparatus 100 is configured to be selectively activated when display enhancement is desirable. The enhancement apparatus 100 may be manually activated by a user of the augmented reality system. In some embodiments, the enhancement apparatus 100 may be automatically activated during predetermined circumstances like night driving, sunny daylight, or when a user enters certain geographic regions (e.g., hilly roads).

The enhancement apparatus 100 is configured to interact with an augmented reality system application processor having a camera and a display driver. In one embodiment, the camera is not a component of the augmented reality system, but may be any camera capable of capturing an image of the viewing region. For example, the camera may be tied to a vehicle (e.g., windshield, window, rearview mirror, and so on) or a helmet/eyepiece worn by a user. In some embodiments, the display driver is configured to display graphics on a liquid crystal on semiconductor (LCoS) component in the transparent display. The enhancement apparatus 100 is configured to interact with any display driver used by the augmented reality system to display graphics on the transparent display.

The term "transparent display" as used herein means a display (e.g., windshield, eyepiece lens) through which a user can view the surrounding region. It will be understood that transparent is not intended to be limited to a "clear" display and displays that are coated, tinted, or otherwise less than perfectly clear are included in the meaning of transparent.

In FIG. 1 a user is viewing a viewing region through a transparent display. Augmented reality notifications can be seen in the bottom left of the transparent display. A target object (e.g., headlight, sun) is present in the viewing region in a position within the viewing region (i.e., "reality") designated A that is beyond the transparent display from the user's perspective. The user's line of sight to the target object, through the transparent display is illustrated by the dashed arrow from the user to the object. The user views the target object by looking through the transparent display at position C.

The camera captures an image of the viewing region. The target object is located at position B in the image. The enhancement apparatus 100 includes an identification logic 110 configured to identify the target object within the image. The identification logic 110 utilizes image processing techniques tailored to characteristics of the target object. If the target object is a face, facial recognition techniques may be used. If the target object is a light producing object, luma information in the image is analyzed.

When the target object is a light producing object such as a headlight in a dark background, the identification logic can quickly identify the object by discarding color information in the image and analyzing just luma information in the image. A low pass filter may be applied to the luma information to remove unnecessary detail in the image. A high pass filter may be applied to the luma information to identify bright objects in the image. To further enhance processing speed, the high pass filter may be implemented in hardware associated with the identification logic 110. Other criteria may be used by the identification logic 110 to speed identification of the target object such as limiting the portion of the image that is searched as described below or limiting the search to objects that are round, come in pairs, and so on. Using some or all of these techniques enables the identification logic 110 to identify a light producing target object in real time or near real time. In one embodiment, the identification logic is configured to identify emergency vehicle lights and/or traffic signal lights. A less obscuring graphic or no graphic may be displayed over these types of lights, so that a user may not be prevented from seeing the emergency vehicle/traffic signal lights.

To increase processing speed, in some embodiments, the enhancement apparatus 100 defines a detection region in the image to limit the portion of the image that is searched by the identification logic 110. The detection region may be defined during an initialization process in which the enhancement apparatus 100 determines which portion of the image will most likely contain the target object. For example, if the target object is a vehicle headlight, the detection region may be determined by sensing the luma delta of the user's vehicle's headlights within the image. The detection region can follow the road including hills and curves using GPS and map information. For traffic lights, which are at a standard height, the detection region can be determined to take into account the standard height. Lights in the detection region corresponding to traffic lights may be disregarded or shielded in a less obscuring manner. If the target object is the sun, the detection region may include the portion of the image most likely to include the sun based on the user's positional orientation, time of day, and season.

The detection region's position and/or size may be modified during operation of the augmented reality system. The detection region may be modified based on global positioning satellite (GPS) data that can be used to predict a shift of the target object within the image, such as the user's car going around a curve. Other data about motion of the user with respect to the target object may also be used to modify the detection region within the image.

In some circumstances it may be desirable to search the entire image for any target objects that meet certain criteria (e.g., any bright light source). When the entire image is searched, target objects with unpredictable positions may be enhanced (e.g., shielded) for the user. Thus, a detection region may not always be defined by the enhancement apparatus 100.

The identification logic 110 identifies the target object at a position in the image (e.g., position B). Based on this position, an enhancement logic 120 is configured to interact with the display driver to display an enhancement graphic on the transparent display. The enhancement logic 120 specifies, to the display driver, the enhancement graphic and a position on the display that will cause the enhancement graphic to be superimposed over the target object from the user's point of view. How one embodiment of the enhancement apparatus 100 determines the proper position for the enhancement graphic on the display will be discussed in more detail with respect to FIG. 2. In FIG. 1, the enhancement graphic is illustrated by the slightly darker rectangle around the position designator C. The enhancement graphic may be a semi-transparent glare-reducing graphic. In some embodiments, the shape and/or opaqueness of the enhancement graphic may be controlled to allow for different levels of shielding.

The enhancement apparatus 100 may be capable of operating in multiple modes in which a mode is associated with a different target object and/or viewing circumstance. Each mode may specify a target object (e.g., object A in FIG. 1), a detection region, and an enhancement graphic. Night driving mode for a windshield could define the target object as a vehicle headlight, a detection region in the image most likely to include headlights, and an enhancement graphic as a semi-transparent glare-reducing object. Daytime driving or hiking mode for an eyepiece could define the target object as the sun, a detection region in the image most likely to include the sun, and an enhancement graphic as a semi-transparent glare-reducing object. Nighttime walking mode could define the target object as any bright light source and may not specify a detection region, so that flashlights, headlights, and so on in any position can be shielded for the user.

Figure 2:
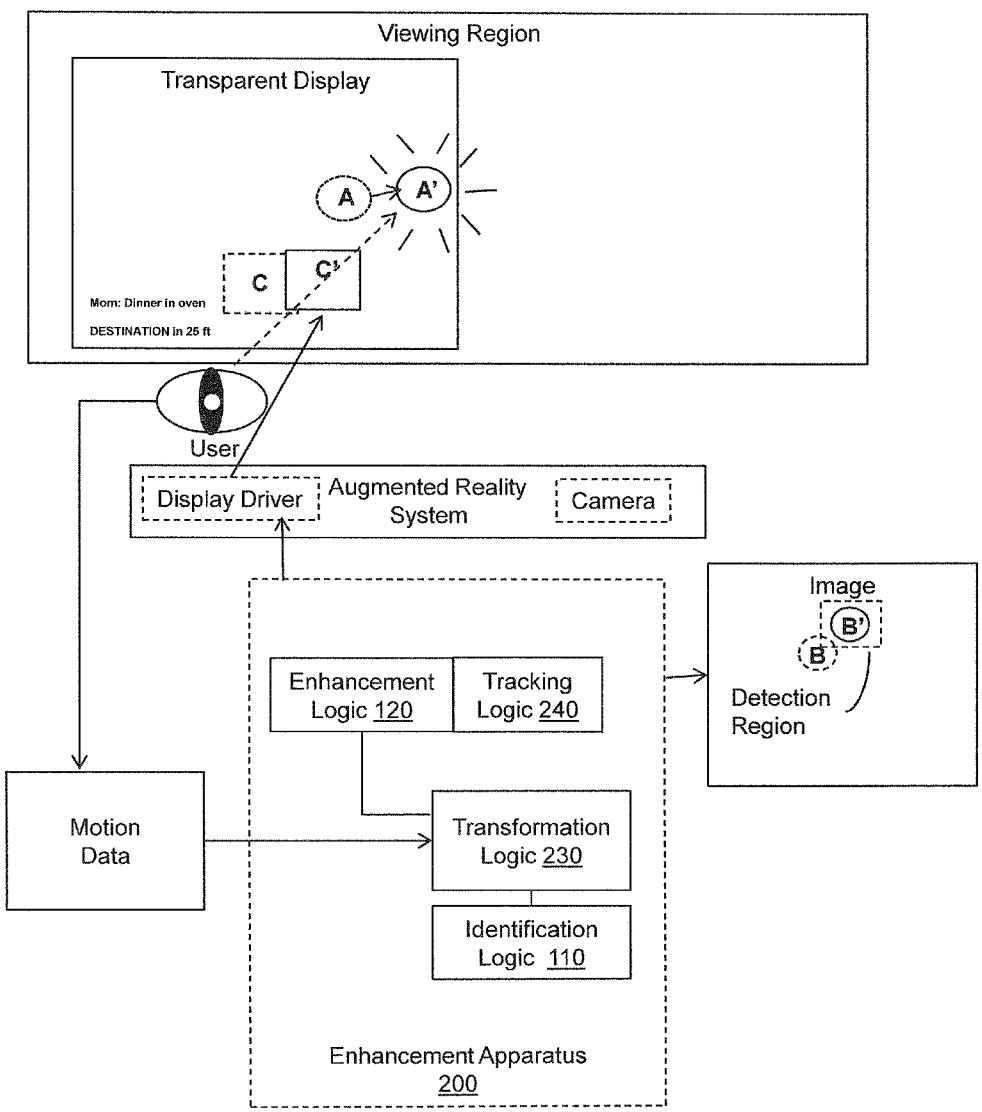
FIG. 2 illustrates one embodiment of an apparatus associated with active augmented reality display enhancement that also provides object tracking.

FIG. 2 illustrates one embodiment of an enhancement apparatus 200 that includes the identification logic 110 and the enhancement logic 120 of the enhancement apparatus 100 shown in FIG. 1. The enhancement apparatus 200 also includes a transformation logic 230. Because the camera is not aligned with the user's line of sight, the position B of the target object within the image may not coincide to the position C in the user's line of sight to the target object within the transparent display. A position transformation is made that maps the position B of the target object in the image to a desired position C of an enhancement graphic on the transparent display that will place the enhancement graphic in the user's line of sight to the target object. In other words, the enhancement graphic, when placed in position C as mapped by the position transformation, will be superimposed on the target object from the user's point of view.

One or more position transformation mappings may be stored for access by the enhancement logic 120. Each transformation mapping takes into account curvature of the windshield and other factors that affect the positional relationship between the location of the target object in the image and the target object as viewed through the display. The transformation logic 230 may be configured to create or select transformation mappings based on input parameters such as the model of the car in which the augmented reality system is in use. When the relative position of the camera and the display are fixed, another remaining variable is the user's position with respect to the display. The transformation logic 230 may be configured to input a user's height or other information that helps fix a relative position between an individual user and the display. In one embodiment, the user's position within the vehicle is determined by sensors or an internal camera. A transformation mapping tailored to the user's height and/or position can be thus be accessed by the enhancement logic 120 for use in determining a position on the display at which the enhancement graphic is to be displayed.

When a user may be moving relative to the display, the transformation logic 230 adjusts the position transformation mapping to reflect the user's new position relative to the display. To this end, the transformation logic 230 may input motion data that describes motion of the user. The motion data can be provided to the transformation logic 230 by accelerometers, gyroscopes, and so on that sense the user's motion. A camera may also track changes in the user's position within the vehicle.

The enhancement apparatus 200 also includes a tracking logic 240. The tracking logic 240 predicts a change in the position of the target object relative to the user that will result in the target object being in a subsequent position A'. The tracking logic 240 calculates a new detection region that limits the search of the image to an area that closely surrounds the position B' in the image corresponding to the predicted subsequent position of the target object A'. In this manner, the tracking logic 240 reduces the overhead associated with image processing by pinpointing the image analysis performed by the identification logic 110. The tracking logic 240 is optional. When the tracking logic is not used, each movement of the enhancement graphic is the result of the identification logic 110 locating the target object within the original detection region in a new image of the viewing region as described with respect to FIG. 1.

The tracking logic 240 may leverage many different types of data to predict a change in the relative position between the target object and the user which can be used to calculate a new position for the enhancement graphic. GPS data may be used to predict a change in the user's vehicle's trajectory (e.g, a curve in the road or a hill), which will change the relative position of the user and the target object. Accelerometers and/or gyroscopes on the user may be used to detect relative motion between the target object and the user, which may be especially advantageous when the transparent display is coupled to a user (e.g., an eyepiece lens).

Figure 3:
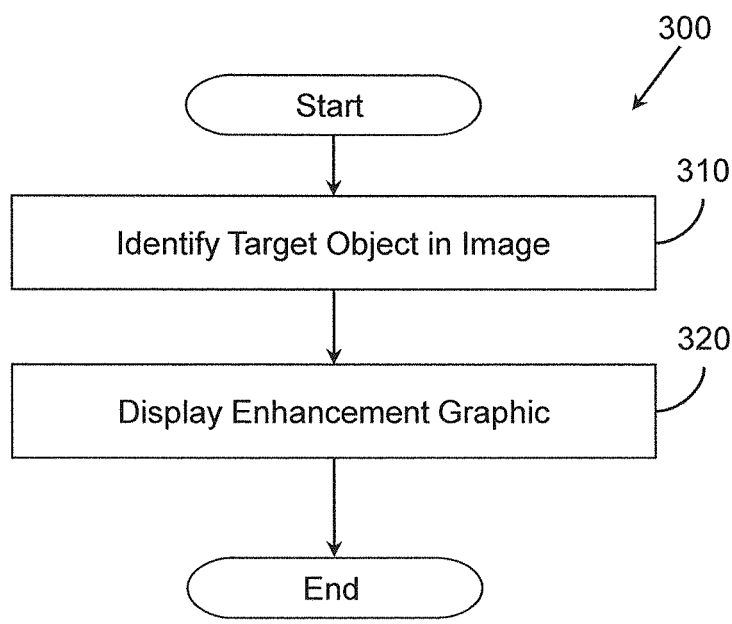
FIG. 3 illustrates one embodiment of a method for actively enhancing an augmented reality display.

FIG. 3 illustrates one embodiment of a method 300 for actively enhancing an augmented reality display. The method includes, at 310, identifying, within an image of a viewing region, a target object visible to a user through a display. At 320, the method includes displaying an enhancement graphic on the display such that the enhancement graphic is superimposed over the target object from the user's point of view.

In one embodiment, the method 300 includes accessing a transformation that maps a first position of a target object in the image to a second position on the display, wherein the second position corresponds to a position on the display through which the user looks to view the target object in the viewing region. The enhancement graphic is displayed at the second location on the display.

In one embodiment, the method includes analyzing information for a detection region of the image, such that information for portions of the image outside the detection region are not analyzed. The method may also include predicting a subsequent position of the target object relative to the user and defining a subsequent detection region based, at least in part, on the predicted subsequent position. The target object is subsequently identified by analyzing information for the subsequent detection region of a subsequent image. A trajectory of the user relative to the target object may be calculated and the subsequent position of the target object may be predicted based on the trajectory.

Figure 4:
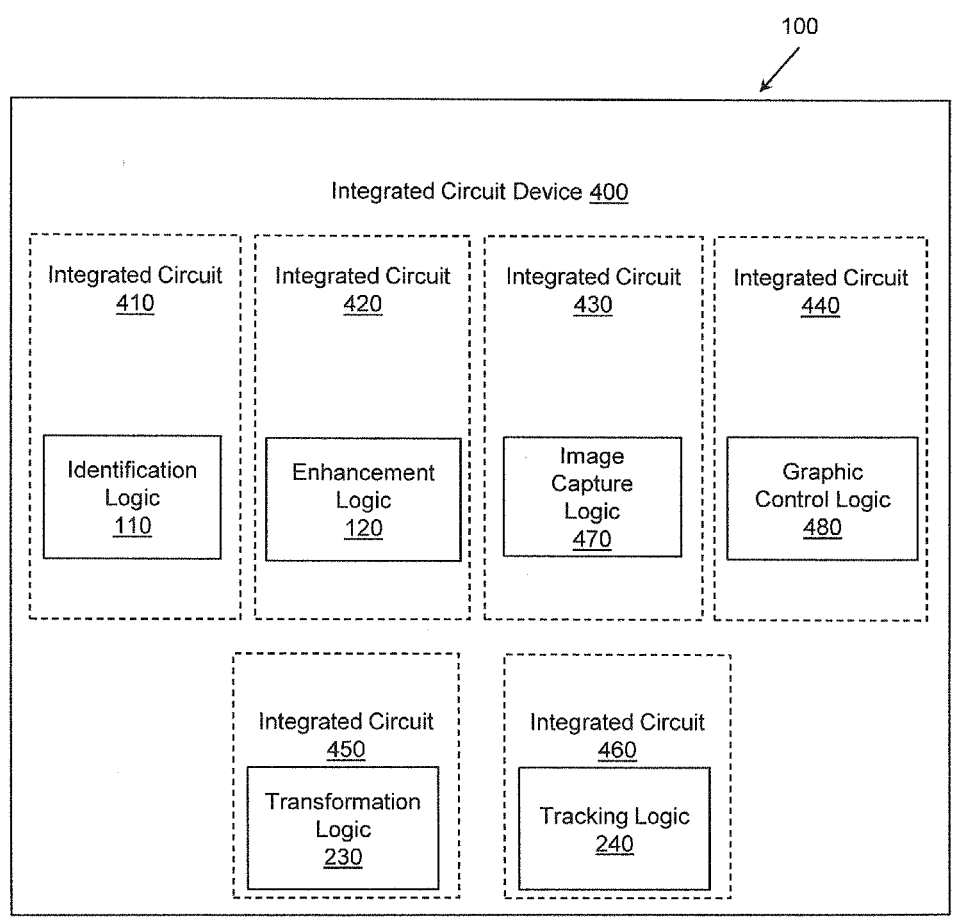
FIG. 4 illustrates one embodiment of an integrated circuit device associated with active augmented reality display enhancement.

FIG. 4 illustrates one embodiment of an integrated circuit device 400 that interacts with an augmented reality system to actively enhance the augmented reality system's display. The various integrated circuits illustrated in FIG. 4 could include hardware or a hardware/software combination. The integrated circuit device includes a first integrated circuit 410 that implements the functionality of the identification logic 110. Inputs to the first integrated circuit 410 may include image data from a selected portion of an image, a target object specification that is used to select an identification technique (e.g., facial recognition, luma analysis) to be used by the identification logic 110. Outputs of the first integrated circuit 410 may include a detected position of the target object within the image. The integrated circuit device includes a second integrated circuit 420 that implements the functionality of the enhancement logic 120. Inputs to the second integrated circuit 420 may include a selection of an enhancement graphic (e.g., glare-reducing semi-transparent graphic) and a position of the target object within the image.

The integrated circuit device 400 also includes a third integrated circuit 430 that implements the functionality of an image capture logic 470. The image capture logic 470 is configured to interact with a camera to obtain image data, such a luma information, from the camera. Inputs to the image capture logic 470 may include a camera type selection that determines protocol for requesting and/or receiving image data from a camera and data describing a selected detection region for the image. Outputs of the image capture logic may include image data for the selected detection region.

The integrated circuit device includes a fourth integrated circuit 440 that implements the functionality of a graphic control logic 480. The graphic control logic 480 is configured to interact with a display driver of the augmented reality system. Inputs to the fourth integrated circuit may include a selection of a type of device driver in use by the augmented reality system. Outputs of the fourth integrated circuit may include a specification of an enhancement graphic and a position at which to display the enhancement graphic.

The integrated circuit device includes a fifth integrated circuit 450 that implements the functionality of the transformation logic 230. Inputs to the fifth integrated circuit may include a selection of a particular transformation mapping and a position of a target object within an image. Outputs of the fifth integrated circuit may include a position at which to display an enhancement graphic.

The integrated circuit device includes a sixth integrated circuit 460 that implements the functionality of the tracking logic 240. Inputs to the sixth integrated circuit may include motion data describing motion of a user, GPS data describing motion of a user's vehicle, and GPS data describing terrain surrounding a user. Outputs of the fourth integrated circuit may include a new detection region to be used in subsequent identification of target objects within a subsequent image.

In some embodiments, the integrated circuit device 400 includes integrated circuits that implement various combinations of the functionalities just described. In some embodiments, the integrated circuit device includes integrated circuits that implement only a subset of the functionalities just described.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An augmented reality apparatus; comprising:
   a processor connected to memory, wherein the processor is configured to execute instructions stored in the memory that cause the processor to:
   receive image data corresponding to an image of a region being viewed by a user through a transparent display;
   define a detection region in the image, the detection region being a portion of the image that is likely to contain a target object in the image, wherein the target object is viewable by the user through the transparent display;
   process the image data, within the detection region corresponding to the portion of the image that is likely to contain the target object, to identify a target object that produced light visible to the user through the transparent display, wherein the instructions stored in the memory cause the processor to identify the target object that produced light based at least on identifying luma information in the image data that corresponds to the target object that produced light, wherein the processing comprises:
   (i) discarding color information in the image data prior to processing the image data to identify the target object that produced light;
   (ii) analyzing the luma information in the image data to detect luma delta between pixels within the image; and
   (iii) utilizing the luma delta to define the detection region, as a portion of the image that includes the luma delta, for identifying the target object that produced light; and
   cause a semi-transparent glare-reducing enhancement graphic to be displayed on a portion of the transparent display such that the semi-transparent glare-reducing enhancement graphic is superimposed; on the portion of the transparent display, over the target object that produced light so as to at least partially obscure the target object that produced light as seen by the user through the transparent display.

2. The apparatus of claim 1, wherein the instructions cause the processor to:
access a transformation that maps a first position of the target object that produced light in the image to a second position on the transparent display, wherein the second position corresponds to a position on the transparent display through which the user looks to view the target object that produced light in the region.

3. The apparatus of claim 2, wherein the instructions cause the processor to adaptively map the first position to the second position, based, at least in part on data describing motion of the user relative to the transparent display.

4. The apparatus of claim 2, wherein the instructions cause the processor to display the semi-transparent glare-reducing enhancement graphic at the second position on the transparent display.

5. The apparatus of claim 1, wherein the instructions cause the processor to identify the target object that produced light by analyzing information for the detection region of the image data, such that information for portions of the image data outside the detection region are not analyzed.

6. The apparatus of claim 5, wherein the detection region is determined a priori by selecting a portion of the image data corresponding to a probable location of the target object that produced light within the detection region.

7. The apparatus of claim 5, wherein the instructions cause the processor to:
predict a subsequent position of the target object that produced light relative to the user; and
define a subsequent detection region based, at least in part, on the predicted subsequent position.

8. The apparatus of claim 7, wherein the subsequent identification of the target object that produced light is performed by analyzing information for the subsequent detection region of a subsequent image.

9. The apparatus of claim 1, wherein:
the transparent display comprises a windshield; and
the target object comprises vehicle headlights of an oncoming vehicle and a sun.

10. The apparatus of claim 1, wherein the transparent display is configured to be worn by the user as part of a helmet or an eyepiece.

11. An augmented reality method, comprising:
receiving image data corresponding to an image of a region being viewed by a user through a transparent display;
processing the image data, within a detection region corresponding to a portion of the image that is likely to contain a target object, to identify the target object that produced light visible to the user through the transparent display, wherein the processing includes analyzing the image data to identify the target object that produced light based at least on identifying luma information in the image data that corresponds to the target object that produced light, wherein the processing comprises:
(i) discarding color information in the image data prior to processing the image data to identify the target object that produced light;
(ii) analyzing the luma information in the image data to detect luma delta between pixels within the image; and
(iii) utilizing the luma delta to define the detection region, as a portion of the image that includes the luma delta, for identifying the target object that produced light; and
displaying an enhancement graphic on a portion of the transparent display, wherein the enhancement graphic is semi-transparent and glare reducing, and wherein the enhancement graphic is superimposed, on the portion of the transparent display, over the target object that produced light so as to at least partially obscure the target object that produced light as seen by the user through the transparent display.

12. The method of claim 11, further comprising:
accessing a transformation that maps a first position of the target object that produced light in the image data to a second position on the transparent display, wherein the second position corresponds to a position on the transparent display through which the user looks to view the target object that produced light in the region.

13. The method of claim 12, further comprising:
displaying the enhancement graphic at the second position on the transparent display.

14. The method of claim 11, wherein the identifying comprises analyzing information for the detection region of the image data, such that information for portions of the image data outside the detection region are not analyzed.

15. The method of claim 14, further comprising:
predicting a subsequent position of the target object that produced light relative to the user; and
defining a subsequent detection region based, at least in part, on the predicted subsequent position.

16. The method of claim 15, wherein the predicting comprises calculating a trajectory of the user relative to the target object that produced light and predicting the subsequent position of the target object that produced light based on the trajectory.

17. The method of claim 15, further comprising:
subsequently identifying the target object that produced light by analyzing information for the subsequent detection region of a subsequent image.

18. The method of claim 10, wherein:
the transparent display comprises a windshield; and
the target object comprises the vehicle headlights of an oncoming vehicle and a sun.

19. The method of claim 11, wherein the transparent display is part of a helmet or an eyepiece.

20. An augmented reality device comprising:
a first integrated circuit configured to:
receive image data corresponding to an image of a region being vie-wed by a user through a transparent display;
process the image data, within a detection region corresponding to a portion of the image that is likely to contain a target object, to identify the target object that produced light visible to the user through the transparent display, wherein the processing includes analyzing the image data to identify the target object that produced light based at least on identifying luma information in the image data that corresponds to the target object that produced light, wherein the processing comprises:
(i) discarding color information in the image data prior to processing the image data to identify the target object that produced light;
(ii) analyzing the luma information in the image data to detect luma delta between pixels within the image; and (iii) utilizing the luma delta to define the detection region, as a portion of the image that includes the luma delta, for identifying the target object that produced light; and a second integrated circuit configured to cause an enhancement graphic to be displayed on a portion of the transparent display, wherein the enhancement graphic is semi-transparent and glare reducing, and wherein the enhancement graphic is superimposed over, on the portion of the transparent display, over the target object that produced light so as to at least partially obscure the target object that produced light as seen by the user through the transparent display.

21. The device of claim 20, further comprising a third integrated circuit configured to:

obtain image data from a camera associated with an augmented reality system.

22. The device of claim 21 wherein the third integrated circuit is configured to provide the image data to the first integrated circuit.

23. The device of claim 20, further comprising a fourth integrated circuit configured to:

receive, from the second integrated circuit, a specification of the enhancement graphic and a desired position of the enhancement graphic on the transparent display.

24. The device of claim 23 wherein the fourth integrated circuit is configured to:

interact with a display driver associated with an augmented reality system to cause the enhancement graphic to be displayed at the desired position.

25. The device of claim 20, further comprising a fifth integrated circuit configured to:

map a first position of the target object that produced light in the image data to a second position on the transparent display, wherein the second position corresponds to a position on the transparent display through which the user looks to view the target object that produced light in the viewing region; and communicate the second position to the second integrated circuit.

26. The device of claim 20, wherein the first integrated circuit and the second integrated circuits comprise hardware or a combination of software and hardware.

27. The device of claim 26, wherein the first integrated circuit is configured to identify the target object that produced light by analyzing information for the detection region of the image, such that information for portions of the image outside the detection region are not analyzed.

28. The device of claim 20, wherein:

the transparent display comprises a windshield; and the target object comprises a headlight of an oncoming vehicle.

29. The device of claim 20, wherein the transparent display is configured to be worn by the user as part of a helmet or an eyepiece.

\* \* \* \* \*